UNITED STATES PATENT OFFICE.

ERNEST JOSZ, OF GANSHOREN, BRUSSELS, BELGIUM, ASSIGNOR TO SOCIÉTÉ ANONYME DU JOXYL, OF KOEKELBERG, NEAR BRUSSELS, BELGIUM.

PROCESS OF PRINTING ON WOOD.

13,214. Specification of Reissued Letters Patent. Reissued Feb. 28, 1911.

No Drawing. Original No. 902,886, dated November 3, 1908, Serial No. 402,359. Application for reissue filed September 14, 1910. Serial No. 582,068.

*To all whom it may concern:*

Be it known that I, ERNEST JOSZ, a subject of the King of Belgium, residing at Ganshoren, Brussels, Belgium, have invented certain new and useful Improvements in Processes of Printing on Wood, of which the following is a specification.

This invention relates to a process for obtaining single color or polychromic impressions on wooden surfaces and veneers in such a manner that any desired ornamental or decorative effects or designs on wooden surfaces are obtained by direct printing with fatty colors or inks, and by the coöperation of the natural structure of the wood.

With this object in view my invention essentially consists in suitably preparing the wooden surface which is to be printed upon so as to remove the difficulties caused by the irregular nature of the wood and then printing directly the prepared surfaces of wood lithographically or by other graphic methods.

In carrying my invention into practice the wooden surfaces or wooden veneers are rendered homogeneous by applying to them solutions which are capable of regularly absorbing fatty matter, besides being elastic, waterproof and transparent. This treatment damages neither the color nor the structure of the wood; primings are entirely dispensed with, and it is possible, by the printing on of decorations with lithographic or other fatty colors, to obtain prints which penetrate into the wooden surfaces and which have the desired effect, especially the effect of inlaid work, as well as enamel and other paintings.

The following mixture is employed, for example, for the preparation of the wood:

| | | |
|---|---|---|
| Turpentine | 700 | parts by weight |
| Benzene | 650 | " " " |
| Linseed oil | 20 | " " " |
| India rubber solution | 50 | " " " |
| Canada balsam | 60 | " " " |
| White wax | 30 | " " " |

This mixture is applied either with a varnishing machine or with a hand brush to the face of the wood.

The essential ingredient of the above mixture is the solution of india rubber, which may be used either alone or mixed with a solution of wax and Canada balsam in turpentine, linseed oil and benzene or with a solution having similar properties. As a further example of a solution of india rubber suitable for the purpose the following compound may be cited:

| | |
|---|---|
| India rubber (Pará) | 100 gr. |
| Turpentine | 1,000 gr. |
| Copal or other fatty varnish | 500 gr. |

A wooden surface rendered homogeneous in this way, yields completely uniform prints, which are not injured by the structure of the wood, inasmuch as the ink or color penetrates uniformly partially into the coating and adheres firmly to the surface, without spreading on the same, and the print is also enabled to dry uniformly, as the varnish constituents thereof cannot be absorbed by the wood unequally.

The printing may be done directly by lithography, book-printing or by any other mechanical printing method.

Lithography is most suitable of all, if the print to be produced lends itself to chomolithography, and in such a case the printing is best done by a metal printing lithographic press.

If the printing is to be done typographically, it is done by means of a typographic platen or flat printing press.

If more or fewer parts of the printing produced by lithography or typography are required to appear in relief or intaglio, the print is first produced quite flat by one of the methods above mentioned, after which the desired parts are pressed down by suitably engraved metallic matrices by the aid of an embossing press. In like manner it is also possible to produce at a single operation raised prints which stand out on a colored ground in the natural color of the wood. For this purpose all that is required are matrices of the kind mentioned engraved in intaglio and the printing surfaces of which are supplied with the particular color by means of an inking roller; by pressing the wooden tablet against the matrix, the surface of the wood is only colored by those portions of the matrix, which are not sunk, while those portions of the wood which enter the sunken parts appear as uncolored raised portions. If on the other hand the raised parts are to appear colored also, but in a color different from that of the ground, the sunken parts of the matrix are first inked with the color to be imparted to the raised parts of the wood, the color is removed from the face of the matrix with a blanket roller, and then the other color which is to form the ground is applied to the face thereof by means of an inking roller. The printed surfaces subsequently receive a coating of varnish or spirit lacquer, for the purpose of protecting the print or imparting brilliancy thereto. This coating may be applied with a brush or by a varnishing machine; wax varnish gives a dull coating.

Having thus described my invention, what I claim, is:

1. The process of printing on wood and veneers, which consists in applying to the wooden surface a transparent coating adapted to absorb fatty inks, and then mechanically printing ornamental and decorative designs thereon, whereby the natural structure of the wooden surface is adapted to coöperate with the printed design to secure an ornamental effect.

2. The process of printing on wood and veneers, which consists in applying to the wooden surface a transparent coating adapted to absorb fatty inks, then mechanically printing ornamental and decorative designs thereon, whereby the natural structure of the wooden surface is adapted to coöperate with the printed design to secure an ornamental effect, and finally applying a protecting coating upon the printed surface.

3. The process of printing on wood and veneers, which consists in applying to the wooden surface a transparent coating adapted to absorb fatty inks, printing on said coated surface with fatty inks, subjecting the printed wooden surface to the action of suitably engraved matrices, and finally applying a protecting coating upon the printed surface.

4. The process of printing on wood and veneers, which consists in applying to the wooden surface a transparent coating capable of absorbing fatty inks, mechanically printing polychromic designs on said wooden surface with fatty inks, whereby the inks are caused to be absorbed by the transparent coating, subjecting the printed wooden surface to the action of suitably engraved matrices, whereby ornamental and decorative effects of inlaid work are produced with the coöperation of the printed polychromic design, and finally applying a protecting coating upon the printed surface.

5. The process consisting in applying to a wooden surface a coating of a solution of india-rubber mixed with a solution of wax and Canada balsam in turpentine, linseed oil and benzene and then printing the said coated surface with fatty inks and finally applying a protecting coating upon the printed wooden surface substantially as described.

6. The process of printing on absorbent material which consists in applying to the surface of such material a coating adapted to absorb coloring matter comprising a fatty ingredient, and then mechanically printing ornamental and decorative designs thereon, whereby the surface so treated coöperates with the printed design to secure an ornamental effect.

7. The process of printing on absorbent material which consists in applying to the surface of such material a coating adapted to absorb coloring matter comprising a fatty ingredient, to thereby render said surface homogeneous, subsequently applying sufficient coloring matter comprising a fatty ingredient to penetrate uniformly partially into the coating wherever applied thereto.

8. The process of printing on absorbent material, which consists in applying to the surface of such material a coating adapted to absorb coloring matter comprising a fatty ingredient, to thereby render said surface homogeneous, subsequently applying sufficient coloring matter comprising a fatty ingredient to penetrate uniformly partially into the coating wherever applied thereto, the remainder of said coloring matter adhering firmly to the surface, and finally applying a protecting coating upon the so colored surface.

In testimony whereof I affix my signature in the presence of two witnesses.

ERNEST JOSZ.

Witnesses:
JAQUES BEDE,
GREGORY PHELAN.

Copies of this patent may be obtained for five cents each, by addressing the "Commissioner of Patents, Washington, D. C."